United States Patent [19]
Vollmann

[11] Patent Number: 5,734,539
[45] Date of Patent: Mar. 31, 1998

[54] SYSTEM FOR RECORDING AND/OR REPRODUCING INFORMATION, INCLUDING A CASSETTE WITH A RECORD CARRIER IN TAPE FORM AND AN APPARATUS

[75] Inventor: Norbert C. Vollmann, Eindhoven, Netherlands

[73] Assignee: U.S. Philips Corporation, New York, N.Y.

[21] Appl. No.: 768,491

[22] Filed: Dec. 18, 1996

[30] Foreign Application Priority Data

Dec. 27, 1995 [EP] European Pat. Off. ............ 95203641

[51] Int. Cl.[6] .............................................. G11B 23/087
[52] U.S. Cl. .............................................. 360/132
[58] Field of Search ...................... 360/132; 242/343, 242/343.2, 347, 347.1, 352, 352.3

[56] References Cited

U.S. PATENT DOCUMENTS

| | | | |
|---|---|---|---|
| 3,497,157 | 2/1970 | Hanes et al. | 242/352 |
| 3,851,840 | 12/1974 | Bastiaans | 242/343.2 |
| 4,093,151 | 6/1978 | Karsh | 242/198 |
| 4,618,903 | 10/1986 | Oishi et al. | 360/132 |
| 5,091,813 | 2/1992 | Ryu | 242/343 |
| 5,454,527 | 10/1995 | Mizutani et al. | 242/343 |

FOREIGN PATENT DOCUMENTS 2062916  7/1971  Germany.

*Primary Examiner*—Robert S. Tupper
*Attorney, Agent, or Firm*—Robert M. McDermott

[57] ABSTRACT

The system in accordance with the invention comprises a cassette (101) and an apparatus (102). The cassette (101) has a housing (110) which accommodates two reel hubs (121 and 122) and an optical tape (140). The optical tape (140) extends past a transparent optical window (118) which is accessible from one side (113a) of the cassette. The reel hubs (121 and 122) are connected to comparatively large winding wheels (131 and 132, respectively). The wheel surfaces (131a and 132a) of the winding wheels (131 and 132) are engageable with and drivable by driving surfaces (181a and 182a, respectively) of the apparatus (102) via openings (113b and 113c). The driving surfaces (181a and 182a) form parts of drive wheels (181 and 182) mounted on shafts of the electric motors (183 and 184). The apparatus (102) further comprises an optical head (172) for writing and/or reading information on/from the optical tape (140) via the optical window (118). The invention has the advantage that it provides a system for recording and/or reproducing information which is very compact and which comprises a small number of movable parts.

25 Claims, 5 Drawing Sheets

SYSTEM FOR RECORDING AND/OR REPRODUCING INFORMATION, INCLUDING A CASSETTE WITH A RECORD CARRIER IN TAPE FORM AND AN APPARATUS

BACKGROUND OF THE INVENTION

1. Field of the Invention

The invention relates to a system for recording and/or reproducing information, including a cassette and an apparatus, which cassette comprises a housing comprising two parallel main walls and a plurality of side walls, two reel hubs accommodated in the housing and each connected to a winding wheel having a circumferential wheel surface, which wheel surfaces are both drivable from a first side of the cassette, an information carrier in tape form, of which a part has been wound onto at least one of the reel hubs and which can be wound from one reel hub onto the other reel hub and vice versa, another part of said information carrier extending past an access window in a side wall to give access to a main surface of the information carrier, and which apparatus comprises a cassette compartment into which the cassette is insertable via an insertion opening, a head for writing and/or reading information on/from the information carrier in tape form, which head projects into the cassette compartment at a side of the cassette compartment which faces the insertion opening and which head faces the insertion opening, drive means which comprise two drive wheels each having a circumferential driving surface of which at least a part is disposed in the cassette compartment.

The invention also relates to such a cassette.

The invention further relates to an apparatus for cooperation with such a cassette.

2. Discussion of the Related Art

Such a system, such a cassette and such apparatus are known from DE-OS 20 62 916. The known cassette comprises a housing which accommodates two reel hubs and a magnetic tape. The reel hubs have flanges which project partly from an opening in a first side wall of the housing. A second side wall, which extends perpendicularly to the first side wall, has been formed with an access opening past which the magnetic tape is guided so as to allow the magnetic tape to be accessed by a magnetic head. The known apparatus comprises movable drive wheels, which are urged against the flanges by means of a spring in order to drive and/or brake the reel hubs. A disadvantage of the known system is that the apparatus for cooperation with the cassette is large in relation to the cassette because it should extend at two sides of the cassette. A disadvantage of the known cassette is that dirt and grease can readily settle on the magnetic tape. A disadvantage of the known apparatus is that it is bulky and that it requires movable wheels or a movable head to enable the cassette to be loaded.

SUMMARY OF THE INVENTION

It is an object of the invention to provide a system of the type defined in the opening paragraph, which enables a compact construction of the apparatus of the above-mentioned type to be obtained. It is another object of the invention to provide a system of the type defined in the opening paragraph, in which the number of movable parts can be small. To this end, the invention is characterized in that the access window is disposed at the first side of the cassette, and said parts of the driving surfaces are oriented towards the insertion opening. These measures enable the head to be positioned relative to the information carrier and the drive means to engage with the winding wheels by inserting the cassette into the apparatus in the direction of the normal to its first side. Thus, it is achieved that the cassette can be brought directly into an operational position with one insertion movement. Moreover, as a result of these measures it is achieved that the apparatus need not be much larger than the cassette. This is because the drive means and the head can be arranged at two adjacent sides or even at one side of the cassette. It is even possible to make the apparatus smaller than the cassette by providing only a shallow cassette compartment, the cassette projecting partly from the apparatus in the operational position. The head may be a magnetic head, in which case the information carrier is formed by a magnetic tape and the access window is formed by an opening. However, the head may alternatively be an optical head, in which case the information carrier is formed by an optical tape and the access window can be either an opening or an optically transparent wall portion. Another advantage is that the positions of the reel hubs and the tape path are symmetrical relative to the access window, so that for example wow and flutter are independent of the direction of transport of the information carrier in tape form.

An embodiment of the system in accordance with the invention is characterized in that the wheel surfaces are disposed wholly within the outline of the housing. This measure makes the cassette more compact and also enables the apparatus to be more compact. In addition, it reduces the risk of the information carrier being slackened or excessively tautened while handling the cassette.

An embodiment of the system in accordance with the invention is characterized in that the cassette comprises a shutter by which the access window can be closed. This measure precludes damaging and soiling of the access window, or if the access window is an opening, damaging and soiling of the information carrier.

An embodiment of the system in accordance with the invention is characterized in that the shutter comprises two shutter sections which are slidable in opposite directions parallel to the first side. Two shutter sections which are movable in opposite directions enable an access window of a given width to be opened with two movements over a distance equal to half the width. This enables the shutter to be opened more rapidly. Moreover, each of the shutter sections can have a width smaller than the width of the access port, thus enabling the wheel surfaces to be made accessible from a first side and an access window of substantial dimensions to be closed.

An embodiment of the system in accordance with the invention is characterized in that the cassette comprises urging means for urging the shutter sections towards one another, each of the shutter sections has a contact surface facing the other shutter section, the contact surfaces bound an entry space which is accessible from the first side of the cassette, the apparatus comprises a wedge-shaped projection which projects into the cassette compartment and which diverges from a narrow portion to a wide portion, the narrow portion being directed towards the insertion opening, and the projection has wedge surfaces for cooperation with the contact surfaces of the shutter sections. As the cassette is introduced into the apparatus the contact surfaces slide over the wedge surfaces, the wedge shape causing the distance between the contact surfaces to increase, thereby opening the shutter.

An embodiment of the system in accordance with the invention is characterized in that the cassette comprises a blocking device for blocking the reel hubs against rotation in a blocking position and releasing the reel hubs to allow rotation in a release position, the blocking device comprises an actuating element by means of which the blocking device can be brought from the blocking position to the release position, and the actuating element can be actuated from the first side, and the apparatus comprises an actuator for cooperation with the actuating element. The blocking device prevents the information carrier from unwinding when the cassette is outside the apparatus. Said measures enable the blocking device to be actuated by means of a compact and simple actuator, for example a fixed pin in the apparatus.

An embodiment of the system in accordance with the invention is characterized in that the blocking device comprises an urging means and a blocking member having two blocking portions and an actuating surface facing the first side, and the urging means urges the blocking portions towards the wheel surfaces. In this way, a blocking device can be obtained by means of only two parts. It is even possible to integrate a resilient part with the blocking member, for example as a single injection-moulded plastics element or as a single metal stamping, so that it is even possible to use just one part.

An embodiment of the system in accordance with the invention is characterized in that the wheel surfaces and the driving surfaces are toothed surfaces. This enables the reel hubs to be driven via a toothed-wheel transmission. Alternatively, said surfaces may be friction surfaces in order to realize a friction-wheel drive. However, teeth are advantageous because a toothed-wheel transmission has broader tolerances for the distance between the meshing toothed wheels. In addition, a toothed-wheel transmission dissipates less power, which is favourable for the power consumption of the apparatus. Moreover, a friction-wheel transmission requires a certain contact pressure. Such a contact pressure could readily disturb the positioning of the cassette and the apparatus relative to one another. Furthermore, teeth are cheaper to realize and can even be integrated with a reel hub, for example by means of injection-moulding. Besides, the height required to transmit a given power is smaller for a toothed wheel than for a friction wheel, as a result of which a toothed wheel yields a more compact cassette and a more compact apparatus.

An embodiment of the system in accordance with the invention is characterized in that the wheel surfaces are accessible via openings in the first side wall. This measure has a favourable influence on the ratio between the width of the information carrier and the required height of the cassette and the apparatus, because the winding wheels can be disposed adjacent the information carrier.

An embodiment of the system in accordance with the invention is characterized in that the wheel surfaces are accessible via openings in a main wall which continue into the first side wall. These measures enable the use of winding wheels of a comparatively small diameter in relation to those in the preceding embodiment, which results in less noise for the same number of revolutions per minute. Moreover, no opening has to be provided in the side wall of the cassette, which renders the cassette more impervious.

An embodiment of the system in accordance with the invention is characterized in that the wedge-shaped projection has a fixed location in the apparatus. In the case that the wall portion can be manufactured by means of an injection-moulding method the wedge-shaped part can be formed by providing for this in the die for the relevant wall portion. Such a wedge-shaped projection also provides protection against damage caused by a cassette which has been inserted into the apparatus, for example, in an inverted position.

An embodiment of the system in accordance with the invention is characterized in that the drive wheels and/or the head have fixed locations in the apparatus. As a consequence, mechanisms for moving the drive wheels and/or the head can be dispensed with, which results in a more accurate position of the drive wheels and/or the head relative to the cassette and in a more compact construction. Preferably, each drive wheel is mounted directly on the shaft of an electric motor. This reduces the number of parts and minimizes lost motion in the coupling between the motor and the reel hub, permitting the tension in the information carrier to be controlled by a well-defined energization of the two motors.

The cassette in accordance with the invention comprises a housing comprising two parallel main walls and a plurality of side walls, two reel hubs accommodated in the housing and each connected to a winding wheel having a circumferential wheel surface, which wheel surfaces are both drivable from a first side of the cassette, an information carrier in tape form, of which a part has been wound onto at least one of the reel hubs and which can be wound from one reel hub onto the other reel hub and vice versa, another part of said information carrier extending past an access window in a side wall to give access to a main surface of the information carrier, the access window being disposed at the first side of the cassette. These measures render the cassette in accordance with the invention suitable for use in the system in accordance with the invention.

The apparatus in accordance with the invention comprises a cassette compartment into which a cassette is insertable via an insertion opening, a head for writing and/or reading information on/from the information carrier in tape form, which head projects into the cassette compartment at a side of the cassette compartment which faces the insertion opening and which head faces the insertion opening, drive means which comprise two drive wheels each having a circumferential driving surface of which at least a part is disposed in the cassette compartment and is oriented towards the insertion opening, which driving surfaces have a dimension in the axial direction of the drive wheels which is less than a quarter of the dimension of the insertion opening in this direction, and which driving surfaces extend near a wall which adjoins the insertion opening. These measures render the apparatus in accordance with the invention suitable for use in the system in accordance with the invention.

BRIEF DESCRIPTION OF THE DRAWINGS

The above and other aspects of the invention will be described in more detail, by way of example, with reference to the drawings, in which.

DETAILED DESCRIPTION OF THE PREFERRED EMBODIMENTS OF THE INVENTION

Figure 1:
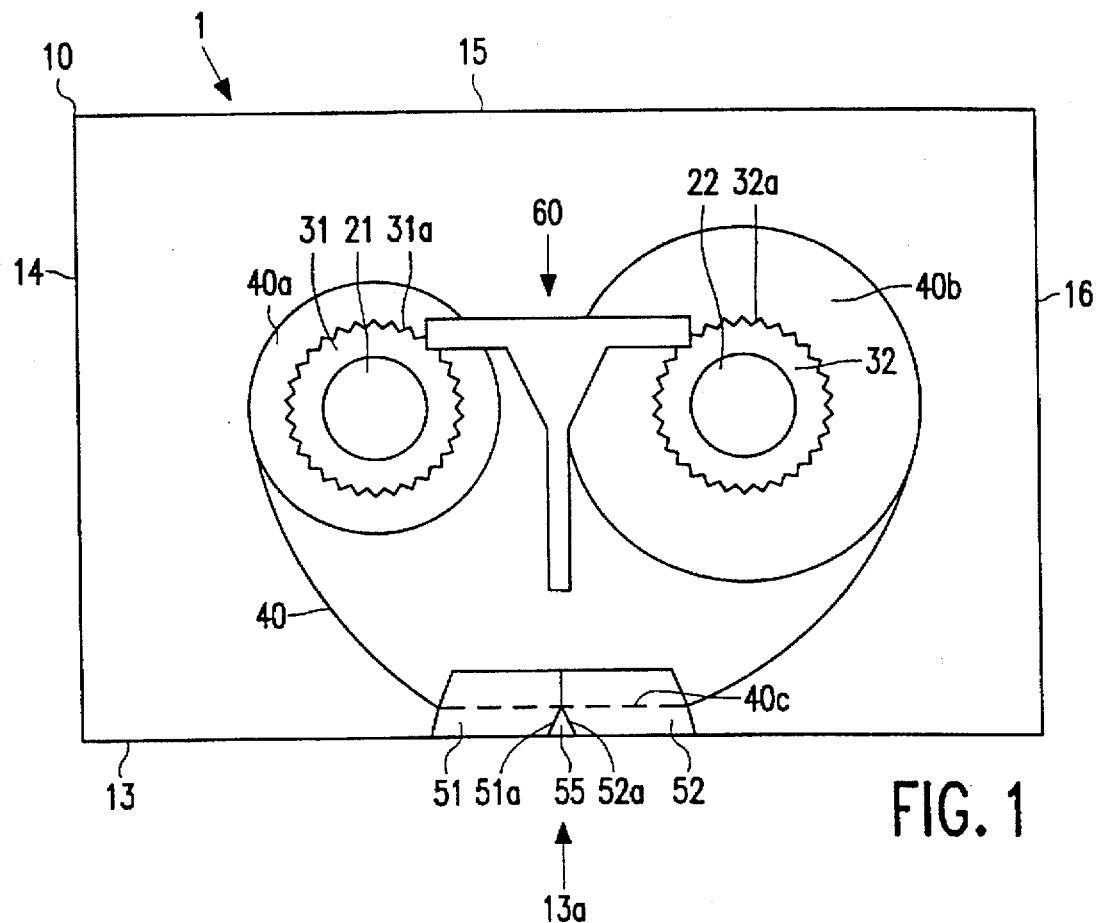
FIG. 1 is an underneath view of a first embodiment of the cassette in accordance with the invention.

FIG. 1 is an underneath view of a first embodiment of the cassette in accordance with the invention. The cassette 1 comprises a housing 10, which accommodates two reel hubs 21 and 22 and an information carrier in tape form, in the present case a magnetic tape 40, of which tape the reel hub 21 holds a part 40a, the reel hub 22 holds a part 40b, and a part 40c extends past an access window 18 (see FIG. 4). The housing 10 comprises two parallel main walls 11 and 12 (see FIG. 2) and four side walls 13, 14, 15 and 16. The access window 18 is situated in the side wall 13 (see FIG. 4). The two reel hubs 21 and 22 are each connected to a winding wheel 31 and 32, respectively. The winding wheels 31 and 32 each have a circumferential wheel surface 31a and 32a, respectively. Both wheel surfaces 31a and 32a are accessible from the side 13a corresponding to the side wall 13 of the cassette 1. The magnetic tape 40 can be wound from the reel hub 21 onto the reel hub 22 and vice versa by driving the winding wheel 32 and the winding wheel 31, respectively. To allow such driving from the side 13a of the cassette the wheel surfaces 31a and 32a are accessible via openings 13b and 13c, respectively, which continue into the side wall 13 (see FIG. 2). The wheel surfaces 31a and 32a are toothed, so that they can be driven by toothed wheels inserted via the openings 13b and 13c, respectively. The wheel surfaces 31a and 32a are disposed wholly within the outline of the housing 10 (see FIG. 2). The cassette 1 has a shutter comprising two shutter sections 51 and 52. In the position illustrated in FIGS. 1 and 2 the shutter sections 51 and 52 close the access window 18.

Figure 2:
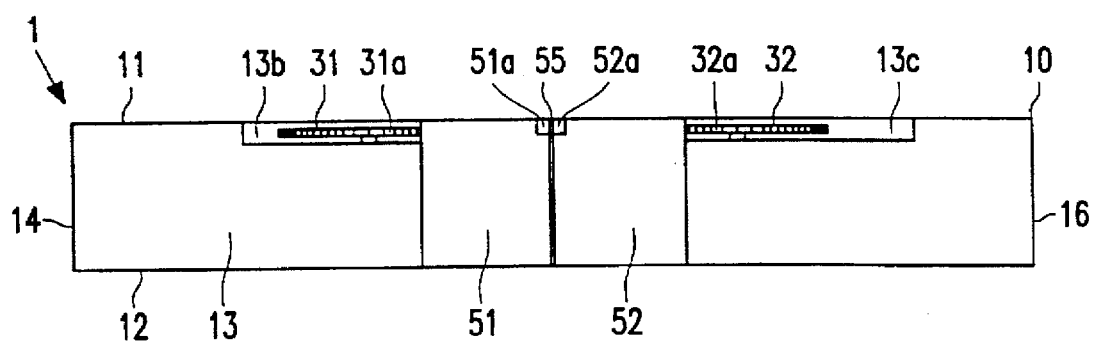
FIG. 2 is a front view of the embodiment shown in FIG. 1.

FIG. 2 is a front view of the cassette shown in FIG. 1. It is clearly visible that the winding wheels 31 and 32 and the wheel surfaces 31a and 32a are disposed wholly within the outline of the housing 10 (see also FIG. 1). The side view shown in FIG. 2 has been taken from the side 13a of the cassette 1 (see FIG. 1). It is apparent that the wheel surfaces 31a and 32a are accessible and can be driven from this side 13a via the openings 13b and 13c.

Figure 3:
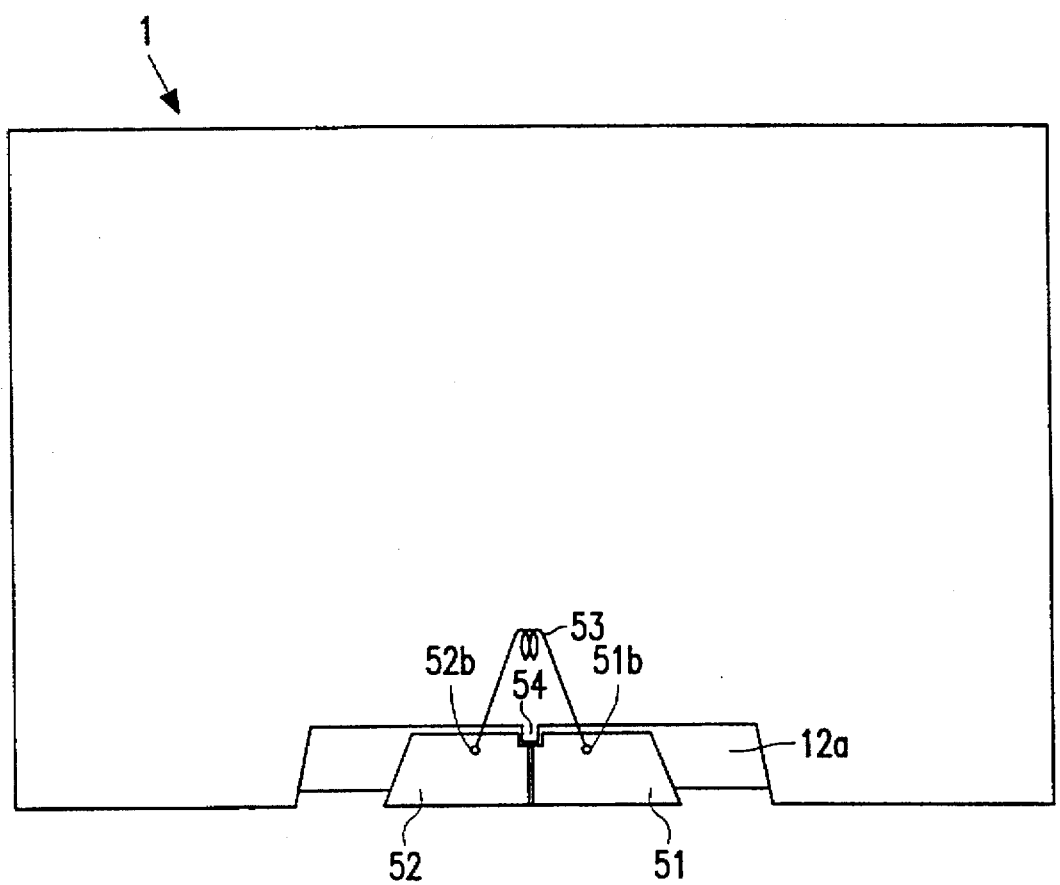
FIG. 3 is a plan view of the embodiment shown in FIGS. 1 and 2.

FIG. 3 is a plan view of the cassette shown in FIG. 1 and FIG. 2. The cassette 1 comprises urging means, in the present case a spring 53, for urging the shutter sections 51 and 52 towards one another. The spring 53 engages in recesses 51b and 52b in the shutter sections 51 and 52. A projection 54 in a side wall of the recess 12a and the spring 53 keep the shutter sections 51 and 52 in their closed position.

Figure 4:
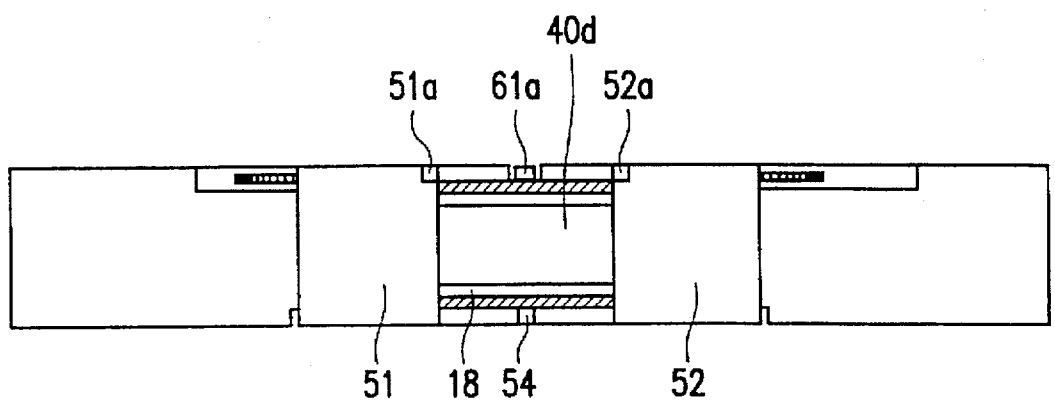
FIG. 4 is a front view of the first embodiment of the cassette in accordance with/the invention, the shutter being shown in its open position.

FIG. 4 is a front view of the embodiment of the cassette shown in FIGS. 1, 2 and 3, the shutter being shown in its open position. In the position shown in FIG. 4 the access window 18 is not covered by the shutter sections 51 and 52. In the present embodiment the access window 18 is an opening to allow a main surface 40d of the magnetic tape 40 to be accessed by a magnetic head 72 (see FIG. 5). The shutter sections 51 and 52 are slidable in two opposite directions parallel to the side wall 13 in order to proceed from the closed position of the shutter sections 51 and 52 shown in FIG. 2 to the open position shown in FIG. 4.

Figure 5:
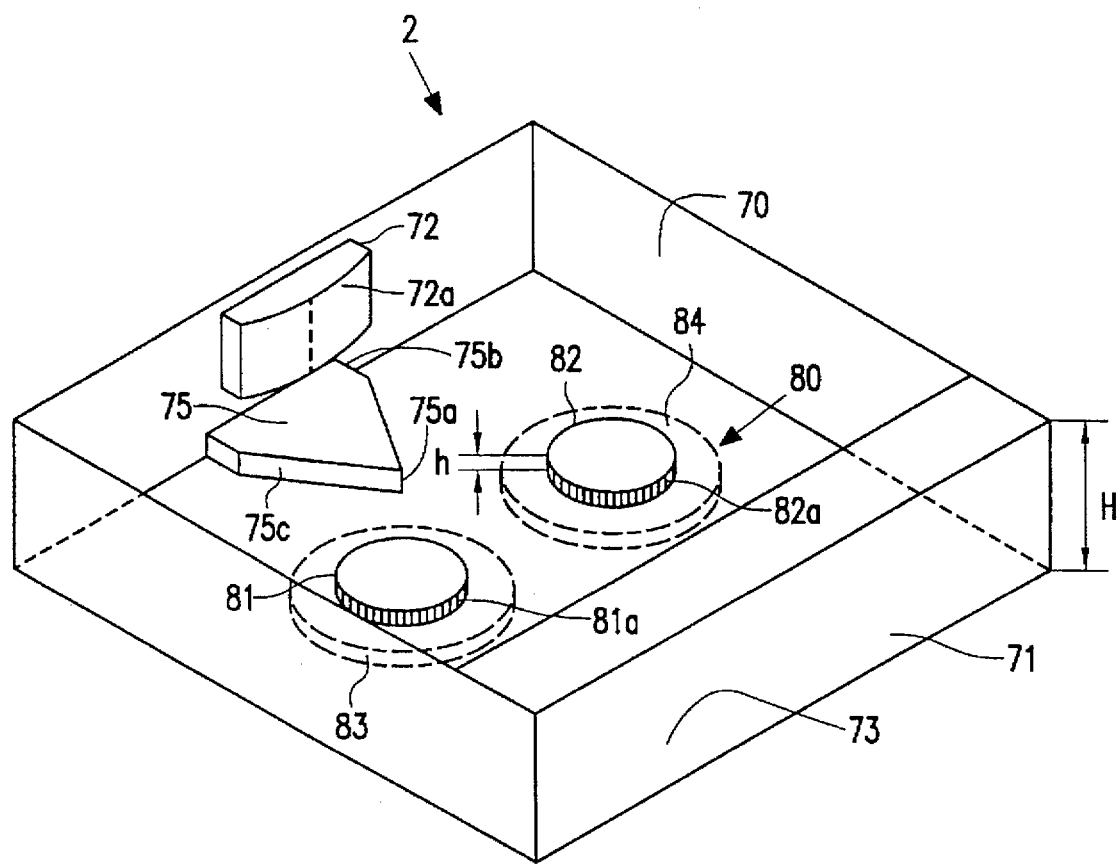
FIG. 5 is a perspective view of a first embodiment of the apparatus in accordance with the invention.

FIG. 5 is a perspective view of a first embodiment of the apparatus in accordance with the invention. The apparatus 2 has a cassette compartment 70 into which the cassette 1 can be inserted via an insertion opening 71. The apparatus 2 further comprises a head, in the present case a magnetic head 72, for writing and/or reading information on/from the magnetic tape 40 (see FIG. 1). The head 72 projects into the cassette compartment 70 at the side of the cassette compartment 70 which faces the insertion opening 71. The head face 72a of the head 72 is directed towards the insertion opening 71. The apparatus 2 further comprises drive means 80, which in the present case comprise two electric motors 83 and 84 provided with two drive wheels 81 and 82. The drive wheels 81 and 82 have circumferential driving surfaces 81a and 82a, which are disposed at least partly in the cassette compartment 70 and which are at least partly oriented towards the insertion opening 71. The driving surfaces 81a and 82a have a dimension h in the axial direction of the drive wheels 81 and 82, which is approximately one tenth of the dimension H of the insertion opening 71 in this direction. The driving surfaces 81a and 82a moreover extend near a wall 73 which bounds the cassette compartment 70 and which adjoins the insertion opening 71.

The apparatus 2 comprises a wedge-shaped projection 75, which projects into the cassette compartment 70. The wedge-shaped projection 75 diverges from a narrow portion 75a to a wide portion 75b. The narrow portion 75a is directed towards the insertion opening 71. The wedge-shaped projection 75 has wedge surfaces 75c and 75d, which extend in a direction parallel to the axial direction of the motors 83 and 84 and the drive wheels 81 and 82.

Figure 6:
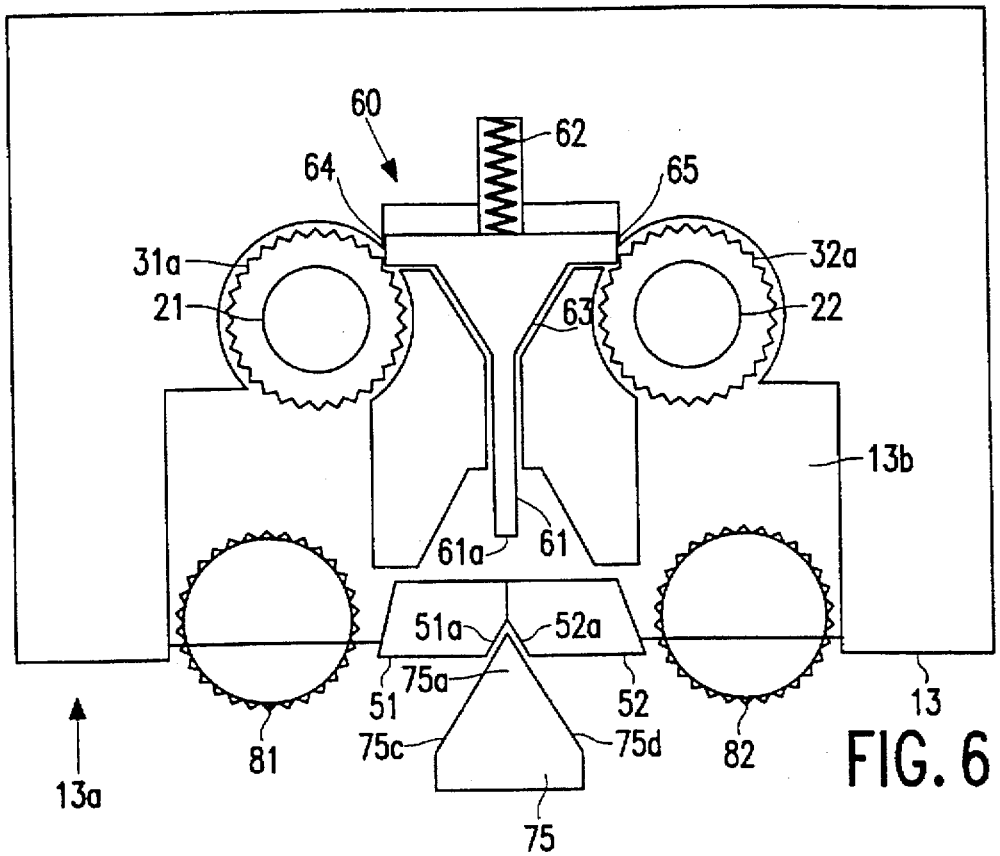
FIG. 6 shows diagrammatically a first embodiment of the system in accordance with the invention, the cassette and the apparatus being shown in a first position relative to one another.

FIG. 6 shows diagrammatically a first embodiment of the system in accordance with the invention, the first embodiment of the apparatus and the first embodiment of the cassette being in a first position relative to one another. The cassette 1 comprises a blocking device 60 for blocking the reel hubs 21 and 22 against rotation. The blocking device 60 comprises a blocking member 63 having two blocking portions 64 and 65 and an actuating portion 61 having an actuating surface 61a, which can be actuated from the side 13a of the cassette 1 (see FIG. 4). In FIG. 6 the blocking device 60 is shown in a blocking position, in which the blocking portions 64 and 65 are urged against the wheel surfaces 31a and 32a by an urging means, in the present case a spring 62. The blocking portions 64 and 65 then engage with the wheel surfaces 31a and 32a, respectively, thereby blocking the reel hubs 21 and 22 against rotation. FIG. 6 shows only the drive wheels 81 and 82 and the wedge-shaped projection 75 of the apparatus 2 shown in FIG. 5. The drive wheels 81 and 82 and the wedge-shaped projection 75 have been mounted at fixed locations in the apparatus 2. By inserting the cassette 1 into the cassette compartment 70 via the insertion opening 71 (see FIG. 5) the drive wheels 81 and 82 will enter the openings 13a and 13b of the cassette 1. The shutter sections 51 and 52 of the cassette 2 each have a contact surface 51a and 52a, respectively. The contact surfaces 51a and 52a each face the other shutter section and bound an entry space 55 (see FIGS. 1 and 2). This entry space 55 serves for the entry of the narrow portion 75a of the wedge-shaped projection 75 during insertion of the cassette 1 into the apparatus 2. The contact surface 51 then engages with the wedge surface 75c and the contact surface 52a engages with the wedge surface 75d. As the cassette 1 is inserted further into the apparatus 2 the contact surfaces 51a and 52a will cooperate with the wedge surfaces 75c and 75d. As a result of this cooperation the shutter sections 51 and 52 will be moved in opposite directions parallel to the side wall 13 to expose the access opening 18 (see FIG. 4).

Figure 7:
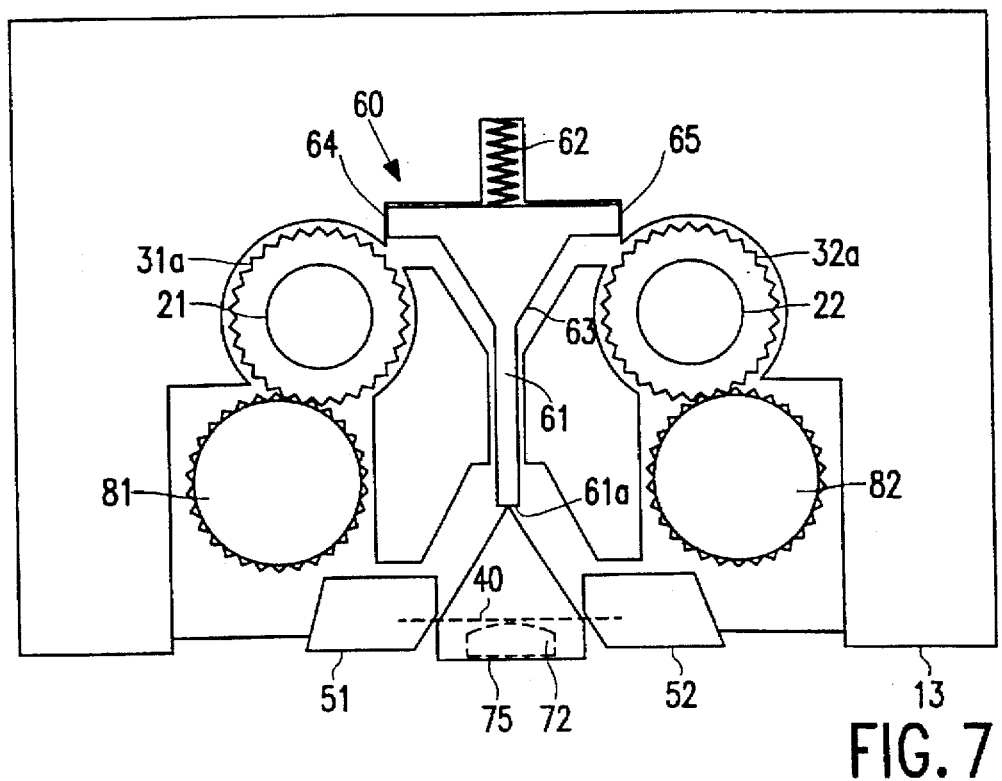
FIG. 7 shows diagrammatically the first embodiment of the system in accordance with the invention, the cassette and the apparatus being shown in a second position relative to one another.

FIG. 7 shows diagrammatically the first embodiment of the system in accordance with the invention, the cassette and the apparatus being shown in a second position relative to one another. In this second position the drive wheels 81 and 82 are in mesh with the winding wheels 31 and 32. The wedge-shaped projection 75 keeps the shutter sections 51 and 52 in their open position. The narrow portion 75a of the wedge-shaped projection 75 then acts upon the actuating surface 61a of the blocking device 60, as a result of which the blocking device 60 is kept in its release position by the wedge-shaped projection 75. This release position is reached in that the wedge-shaped projection 75 has moved the blocking member 63 to its release position, opposed by the spring, via the actuating surface 61a during insertion of the cassette 1 into the apparatus 2, causing the blocking portions 64 and 65 to be disengaged from the wheel surfaces 31a and 32a. By the movement of the cassette 1 from the position shown in FIG. 6 to the position shown in FIG. 7 the cassette 1 and the apparatus 2 are set to an operational position in which the magnetic head 72 can cooperate with the magnetic tape 40.

Figure 8:
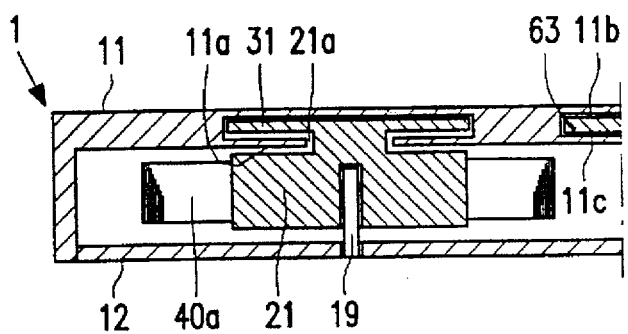
FIG. 8 shows a part of the first embodiment of the cassette in accordance with the invention.

FIG. 8 is a sectional view of the cassette 1 in accordance with the first embodiment of the invention. The reel hub 21 is journalled on a spindle 19 connected to the main wall 12 of the cassette 1. The reel hub 21 carries a winding formed by a part 40a of the magnetic tape 40. The winding wheel 31 and the reel hub 21 have been integrated to form a single part manufactured by means of, for example, injection-moulding technology. The reel hub 21 and the winding wheel 31 are partly separated by a constriction 21a. A wall portion 11a of the main wall 11 engages in this constriction. In this way a labyrinth is formed to preclude the ingress of dirt into the cassette 1. FIG. 8 further shows that the blocking member 63 is situated between two wall portions 11b and 11c of the main wall 11. As a result, the blocking member 63 is positioned correctly and the blocking device 60 (see FIG. 7) is protected against the ingress of dirt and dust.

Figure 9:
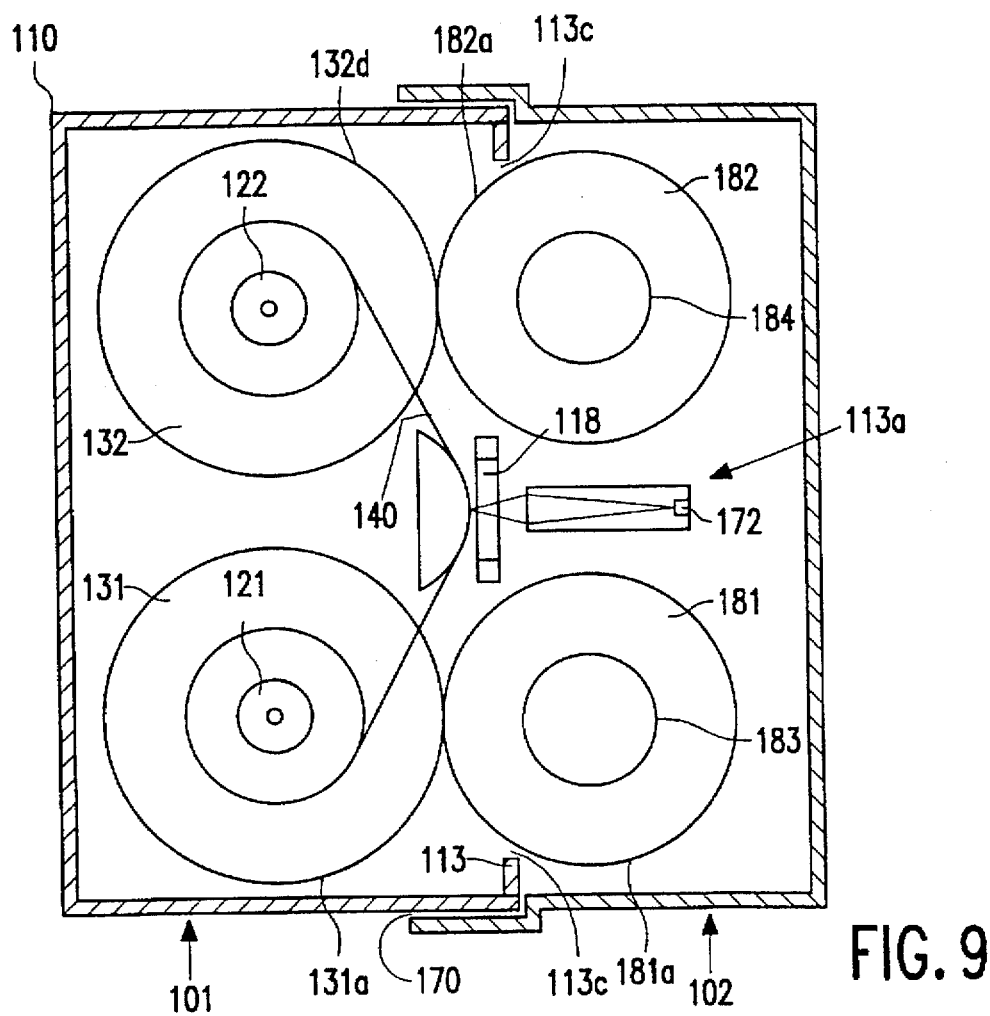
FIG. 9 is a cut-away plan view showing a second embodiment of the system in accordance with the invention.
Figure 10:
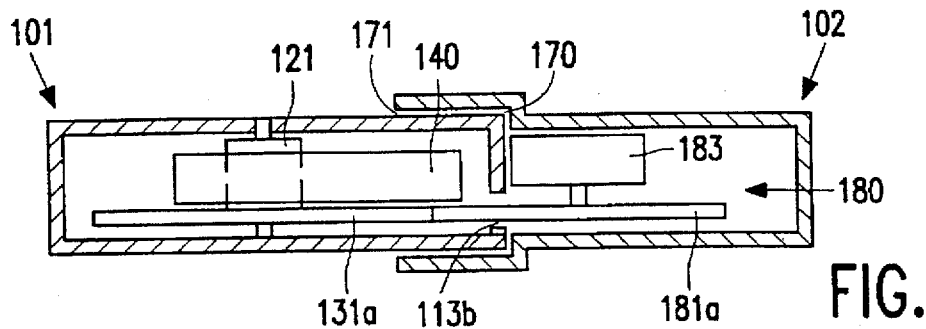
FIG. 10 is a cut-away side view of the second embodiment of the system in accordance with the invention shown in FIG. 9.

FIG. 9 is a cut-away plan view of a second embodiment of the system in accordance with the invention. This second embodiment of the system in accordance with the invention comprises a cassette 101 and an apparatus 102. The cassette 101 comprises a housing 110, which accommodates two reel hubs 121 and 122 and an information carrier in tape form, in the present case an optical tape 140. The optical tape 140 extends past a transparent optical window 118, which is accessible from a side 113a of the cassette. The reel hubs 121 and 122 are connected to comparatively large winding wheels 131 and 132, respectively. The wheel surfaces 131a and 132a of the winding wheels 131 and 132 can be accessed and driven by respective driving surfaces 181a and 182a of the apparatus 102 via openings 113b and 113c. The driving surfaces 181a and 182a form parts of the drive wheels 181 and 182 mounted on shafts of the electric motors 183 and 184. The apparatus 102 further comprises an optical head 172 for writing and/or reading information on/from the optical tape 140 via the optical window 118. In the present embodiment the wheel surfaces 131a and 132a and the driving surfaces 181a and 182a comprise friction surfaces. This has the advantage that a uniform and silent drive of the reel hubs 121 and 122 is achieved. The apparatus 102 has a very short cassette compartment 170. This is possible because the wheel surfaces 131a and 132a of the cassette 101 associated with the apparatus 102 are drivable near the side wall 113. This second embodiment 102 of the apparatus in accordance with the invention is very compact and is even smaller than the cassette 101 (also see FIG. 10). The cassette 101 and the apparatus 102 are brought into an operational position relative to one another by inserting the cassette 101 into the cassette compartment 170. Snap or hold-down means, not shown, hold the cassette 101 in position relative to the apparatus 102.

An advantage of the invention is that it provides a system for recording and/or reproducing information which is very compact and which comprises a small number of movable parts.

It is to be noted that the invention is not limited to the embodiments shown herein. Various other embodiments are possible within the scope of the invention. The cassette may, for example, be provided with idler wheels which are in drivable engagement with the reel hubs and which have driving surfaces which are accessible from the side of the cassette in which the access window is situated. It is also possible to drive the drive wheels of the apparatus by means of an electric motor via a transmission mechanism. In that case changing over is possible to drive two drive wheels with the same motor. It is also possible to provide the cassette with a pivotable shutter instead of a slidable shutter. Moreover, the drive wheels, the wedge-shaped projection and/or the head may be mounted in the apparatus so as to be movable. Said parts can then be brought into an operational position by means of a mechanism when the cassette has already been loaded into the cassette compartment. Finally, it is to be noted that the cassette may be provided with an electronic memory to exchange information about the data stored on the information carrier with the apparatus via electrical contacts which are accessible from the first side of the cassette.

I claim:

1. A system for recording and/or reproducing information, including a cassette and an apparatus, which cassette comprises a housing comprising two parallel main walls and a plurality of side walls, two reel hubs accommodated in the housing and each connected to a winding wheel having a circumferential wheel surface, which wheel surfaces are both drivable from a first side of the cassette, an information carrier in tape form, of which a part has been wound onto at least one of the reel hubs and which can be wound from one reel hub onto the other reel hub and vice versa, another part of said information carrier extending past an access window in a side wall to give access to a main surface of the information carrier, and which apparatus comprises a cassette compartment into which the cassette is insertable via an insertion opening, a head for writing and/or reading information on/from the information carrier in tape form, which head projects into the cassette compartment at a side of the cassette compartment which faces the insertion opening and which head faces the insertion opening, drive means which comprise two drive wheels each having a circumferential driving surface of which a driving part is disposed in the cassette compartment, characterized in that the access window is disposed at the first side of the cassette, said driving parts of the driving surfaces are oriented towards the insertion opening, said reel hubs each having a circumferential hub surface, said connection between each of said reel hubs and each winding wheel being a connector having a circumference less than the circumference of the winding wheel and the reel hub, thereby forming a constricted area between said hub and said winding wheel, and said main wall of said cassette comprises a wall portion disposed within said constricted area.

2. A system as claimed in claim 1, characterized in that the wheel surfaces are disposed wholly within the outline of the housing.

3. A system as claimed in claim 1, characterized in that the cassette comprises a shutter by which the access window can be closed.

4. A system as claimed in claim 3, characterized in that the shutter comprises two shutter sections which are slidable in opposite directions parallel to the first side.

5. A system for recording and/or reproducing information, including a cassette and an apparatus, which cassette comprises a housing comprising two parallel main walls and a plurality of side walls, two reel hubs accommodated in the housing and each connected to a winding wheel having a circumferential wheel surface, which wheel surfaces are both drivable from a first side of the cassette, an information carrier in tape form, of which a part has been wound onto at least one of the reel hubs and which can be wound from one reel hub onto the other reel hub and vice versa, another part of said information carrier extending past an access window in a side wall to give access to a main surface of the information carrier, a shutter which comprises two shutter sections which are slideble in opposite directions parallel to the first side and which apparatus comprises:

a cassette compartment into which the cassette is insertable via an insertion opening, a head for writing and/or reading information on/from the information carrier in tape form, which head projects into the cassette compartment at a side of the cassette compartment which faces the insertion opening and which head faces the insertion opening, drive means which comprise two drive wheels each having a circumferential driving surface of which a driving part is disposed in the cassette compartment, characterized in that the access window is disposed at the first side of the cassette, said driving parts of the driving surfaces are oriented towards the insertion opening, the cassette comprises urging means for urging the shutter sections towards one another, each of the shutter sections has a contact surface facing the other shutter section, the contact surfaces bound an entry space which is accessible from the first side of the cassette, the apparatus comprises a wedge-shaped projection which diverges from a narrow portion to a wide portion, the narrow portion being directed towards the insertion opening, and the projection has wedge surfaces for cooperation with the contact surfaces of the shutter sections such that a movement of the cassette into the cassette compartment brings the shutter contact surfaces in contact with the wedge-shaped projection first with the narrow section and further movement inward moves the shutter sections apart as the contact surfaces move along the wedge-shaped projection toward its wide portion.

6. A system as claimed in claim 5, characterized in that the cassette comprises a blocking device for blocking the reel hubs against rotation in a blocking position and releasing the reel hubs to allow rotation in a release position, the blocking device comprises an actuating element by means of which the blocking device is brought from the blocking position to the release position, and the actuating element is actuated from the first side, and the apparatus comprises an actuator for cooperation with the actuating element.

7. A system as claimed in claim 6, characterized in that the blocking device comprises an urging means and a blocking member having two blocking portions and an actuating surface facing the first side, and the urging means urges the blocking portions towards the wheel surfaces.

8. A system as claimed in claim 1, characterized in that the wheel surfaces and the driving surfaces are toothed surfaces.

9. A system as claimed in claim 1, characterized in that the wheel surfaces are accessible via openings in the first side wall.

10. A system as claimed in claim 1, characterized in that the wheel surfaces are accessible via openings in a main wall which continue into the first side wall.

11. A system as claimed in claim 5, characterized in that the wedge-shaped projection has a fixed location in the apparatus.

12. A system as claimed in claim 1, characterized in that the drive wheels and/or the head have fixed locations in the apparatus.

13. A cassette comprising a housing comprising two parallel main walls and a plurality of side walls, two reel hubs accommodated in the housing and each connected to a winding wheel having a circumferential wheel surface, which wheel surfaces are both drivable from a first side of the cassette, an information carrier in tape form, of which a part has been wound onto at least one of the reel hubs and which can be wound from one reel hub onto the other reel hub and vice versa, another part of said information carrier extending past an access window in a side wall to give access to a main surface of the information carrier, characterized in that the access window is disposed at the first side of the cassette said reel hubs each having a circumferential hub surface, said connection between each of said reel hubs and each winding wheel being a connector having a circumference less than the circumference of the winding wheel and the reel hub, thereby forming a constricted area between said hub and said winding wheel, and said main wall of said cassette comprises a wall portion disposed within said constricted area.

14. A cassette as claimed in claim 13, characterized in that the wheel surfaces are disposed wholly within the outline of the housing.

15. A cassette as claimed in claim 13, characterized in that the cassette comprises a shutter by which the access window can be closed.

16. A cassette as claimed in claim 15, characterized in that the shutter comprises two shutter sections which are slidable in opposite directions parallel to the first side.

17. A cassette as claimed in claim 16, characterized in that the cassette comprises urging means for urging the shutter sections towards one another, each of the shutter sections has a contact surface facing the other shutter section, the contact surfaces bound a cassette space which is accessible from the first side of the cassette.

18. A cassette as claimed in claim 13, characterized in that the cassette comprises a blocking device for blocking the reel hubs against rotation in a blocking position and releasing the reel hubs to allow rotation in a release position, the blocking device comprises an actuating element by means of which the blocking device is brought from the blocking position to the release position, and the actuating element is actuated from the first side.

19. A cassette as claimed in claim 18, characterized in that the blocking device comprises an urging means and a blocking member having two blocking portions and an actuating surface facing the first side, and the urging means urges the blocking portions towards the wheel surfaces.

20. A cassette as claimed in claim 13, characterized in that the wheel surfaces are toothed surfaces.

21. A cassette as claimed in claim 13, characterized in that the wheel surfaces are accessible via openings in the first side wall.

22. A cassette as claimed in claim 13, characterized in that the wheel surfaces are accessible via openings in a main wall which continue into the first side wall.

23. An apparatus for recording and/or reproducing information on/from a cassette comprising shutters, said shutters having opposing contact surfaces, said apparatus comprising a cassette compartment into which the cassette is insertable via an insertion opening, a head for writing and/or reading information on/from the cassette, which head projects into the cassette compartment at a side of the cassette compartment which faces the insertion opening and which head faces the insertion opening, drive means which comprise two drive wheels each having a circumferential driving surface of which at least a part is disposed in the cassette compartment and is oriented towards the insertion opening, which driving surfaces have a dimension in the axial direction of the drive wheels which is less than a quarter of the dimension of the insertion opening in this direction, and which driving surfaces extend near a wall which adjoins the insertion opening, characterized in that the apparatus comprises a wedge-shaped projection which diverges from a narrow portion to a wide portion, the narrow portion being directed towards the insertion opening, such that a movement of the cassette into the cassette compartment brings the shutter contact surfaces in contact with the wedge-shaped projection first with the narrow section and further movement inward moves the shutter sections apart as the contact surfaces move along the wedge-shaped projection toward its wide portion.

24. An apparatus as claimed in claim 23, characterized in that the wedge-shaped projection has a fixed location in the apparatus.

25. An apparatus as claimed in claim 23, characterized in that the drive wheels have fixed locations in the apparatus.

* * * * *